No. 774,790. PATENTED NOV. 15, 1904.
E. H. SEDDON.
PNEUMATIC TIRE.
APPLICATION FILED NOV. 24, 1903.
NO MODEL.

WITNESSES
W. M. Kuehne
John A. Percival

INVENTOR
Edward Henry Seddon
BY Richard Smith
ATTORNEYS

No. 774,790.

Patented November 15, 1904.

UNITED STATES PATENT OFFICE.

EDWARD HENRY SEDDON, OF BROOKLANDS, ENGLAND.

PNEUMATIC TIRE.

SPECIFICATION forming part of Letters Patent No. 774,790, dated November 15, 1904.

Application filed November 24, 1903. Serial No. 182,538. (No model.)

*To all whom it may concern:*

Be it known that I, EDWARD HENRY SEDDON, a subject of the King of Great Britain, and a resident of Brooklands, in the county of Chester and Kingdom of Great Britain, have invented new and useful Improvements in Pneumatic Tires, of which the following is a specification.

This invention relates to improvements in pneumatic tires, particularly in those for motor and other heavy vehicles, and has for its object the production of a simple, reliable, and easily-repaired tire.

The improvements in this tire over the one described in Patent No. 747,001, granted to me on December 15, 1903, consist in the elimination of one of the elements of the combination claimed in the patent—namely, the hoop C of said patent—and also in the absence of the dovetail head $g^4$. The hoop C has to be loosened and taken off along with the tire and in putting the tire on has first to be inserted into its position relatively to the tire and pushed onto the felly along with it. The cost of the hoop and inconvenience of having to take it off and put it on again are avoided in the present construction. The chief advantage, however, consists in the doing away with the dovetail head $g^4$. The tire present can be more cheaply molded and can be vulcanized in a two-part iron mold or case, while for molding the tire shown in Patent No. 747,001 a three-part mold with a loose ring in three parts is required. The hoop C has to be inserted into the cavity molded on the tire while in its unvulcanized and plastic state, which is a very troublesome operation, and the soft tire has to be put with this hoop in it into the mold. It has to be made in three parts in order to get it in easily without disturbing the plastic rubber, and the parts have to be fixed by screws to the bottom part of the mold, which in its turn makes it necessary for the hoops to be put on in an exact circumferential position to this bottom part. The whole operation is very troublesome and the tire costs nearly twice as much for labor as the present tire.

Figure 1:
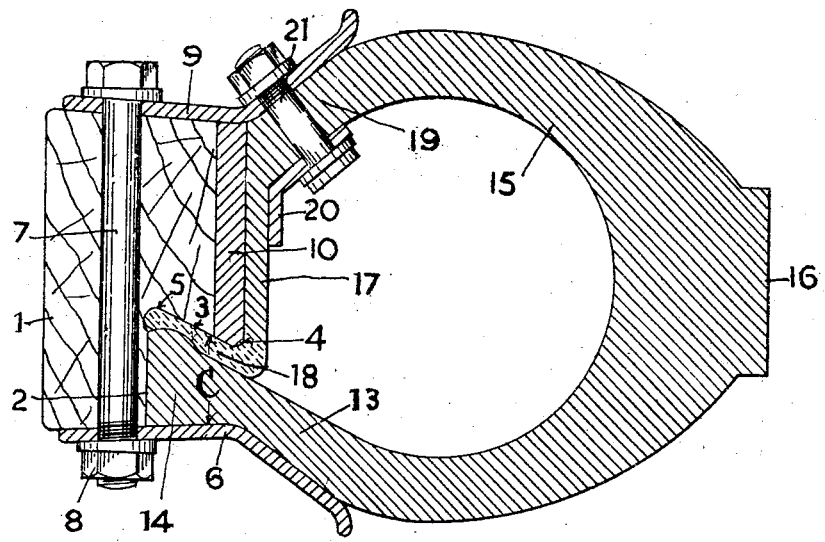
Figure 2:
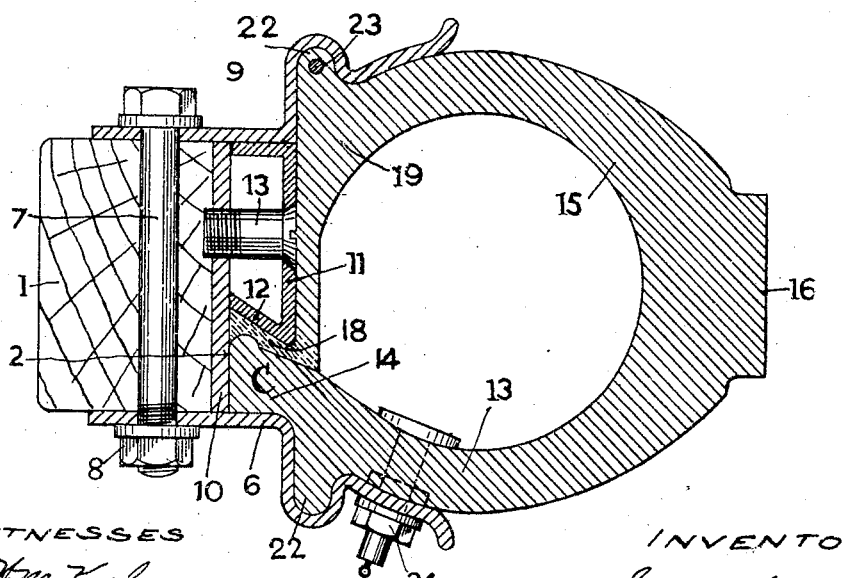

The tire shown in Figure 2 has a hoop; but this is a fixture on the felly and need never come off. The two variations, Figs. 1 and 2, permit one and the same size of tire to be used on two slightly-different sizes of wheels.

The claims in Patent No 747,001 are quite specific, claiming the special combination of all the parts shown in said patent, and do not cover the special combination claimed in this application, and for this reason the application for another patent has been made. The present claims are brought to distinguish from the claims of the patent.

In a tire made in accordance with this invention no separate air chamber or tube is required, as the tire forms an air-tight tube when secured to the felly of the wheel. The tire is formed with an annular joint near to or at one side of the base and is secured to the felly and sealed by means of side flanges or cheeks, one of which is removable.

The drawings attached hereunto illustrate my invention in its application to wheels having wooden fellies, Fig. 1 showing a section of the tire applied to a broad felly, and Fig. 2 a section of the tire applied to a narrow felly.

The felly 1, Fig. 1, is formed with an annular groove at one corner, one side, 2, of which groove is cylindrical and the other side, 3, conical, forming an acute angle with side 2, so that the edge 4 at the periphery of the felly overhangs the edge 5 at the inner periphery of the groove. An annular metal flange 6 is detachably secured to the side of the felly in which the groove is formed, preferably by bolts 7, with nuts 8, which bolts pass through the felly. When this flange is secured in the felly, there is left an annular space between the side 3 of the groove and the said flange, forming with the same a dovetail groove C. Upon the other side of the felly is fixed a similar flange 9, preferably by the same bolts 7, the heads of which are arranged upon this side. This flange 9 is not required to be detachable and may be permanently secured to the felly in any suitable manner.

Both flanges 6 and 9 stand up above the peripheral face of the felly, which when made of wood, as in the case illustrated, has a metal hoop 10 shrunk thereon. The outer edges of the flanges converge outward and the tire sits between them upon the hoop 10.

In already-existing wheels, the fellies of which are too narrow to allow a groove to be turned out of them without weakening them too much, a hoop 11, Fig. 2, having one conical side 12, is fixed by screws 13 on the hoop 10 of the felly, or a hoop having the combined section of the two hoops 10 and 11 may be shrunk upon the felly.

The tire 15 consists of an annular endless tube, preferably of the form in cross-section illustrated in the drawings, which is shown with a thickened tread 16, a bottom 17, formed in one piece with the body, having a deep flange 18 approximately in the plane of the wheel, formed, preferably, of soft india-rubber and adapted to pass into the "dovetail" groove C and lie against the inner side 3 thereof and not adapted to fill it when the tire sits in the position indicated in the drawings. The opposite side 13 of the tire is formed with a dovetail bead or rim 14, adapted to lie in the said groove, and when pressed against the flange 18 to make an air-tight joint. The flange 18 and the beaded rim 14 together in thickness slightly exceed the lateral depth of the groove C in order to allow for compression of the material of the tire, which is built up of india-rubber and canvas in the well-known way, and preferably faced with soft india-rubber on the inner side of the rim 14.

The metal flange 6 is applied after the tire is pushed upon the felly against the metal flange 9, and when bolted tightly to the felly presses the flange 18 and the beaded rim 14 close together, thereby securing that side of the tire to the felly and making an air-tight joint. The other side of the tire may be secured to the metal flange 9 by means of the bolts 21 only or by means of an annular ring-clamp 20 in one piece or in segments having bolts passing through it and through the side of the tire and flange 9. Instead thereof the tire may simply have an inextensible wire or wires inserted into the wall of the tire near to the felly and flange 9, or the tire may be formed with annular projections 22 and the flanges 9 and 6 with recesses adapted to contain them, a wire 23 being preferably inserted into them. The valve 24 may be passed through the felly 1, but preferably is passed through the metal flange 6, as shown.

I claim as my invention—

1. A pneumatic tire provided with an inflating-valve, adapted to fit a felly having an annular groove in one side at the corner and having annular flanges projecting above the felly, one of which flanges partly covers the said groove and is detachable, which tire consists of an annular tube having a flat bottom adapted to sit upon the felly between the annular flanges, an annular joint at one side of the bottom and an outside flange formed at the edge thereof, a "dovetail" bead formed upon the inside margin of the other side of the tire at the joint adapted to enter the said groove and bear against the other flange of the tire when the detachable flange of the felly is secured thereto substantially as and for the purpose herein described.

2. The combination with a felly having an annular groove at one outer corner deeper at its inner than at its outer periphery, and annular flanges projecting above the felly, one of which is detachable, of a tire made of india-rubber and canvas and of horseshoe-shaped section with a flat bottom formed in one piece with one side of the tire, and extending to the edge of said groove and having an outside flange formed on it, the other side of the tire being separate from said flange and formed with a dovetail enlargement upon its inside margin adapted to enter said groove and bear against the flange of the tire-bottom when the detachable flange of the felly is secured thereto, means for holding the opposite side of the tire against the other flange and a valve for inflating the tire.

3. As an article of manufacture a pneumatic tire having arch-shaped sides and tread, a bottom adapted to fit a cylindrical felly formed at the margin of one side of the tire, an outside flange at the edge of the bottom, a dovetail enlargement formed at the margin of the other side of the tire and adapted to bear against said flange.

4. In a pneumatic tire the combination of arch-shaped sides 13, 19, and tread 16, a bottom 17 adapted to fit a cylindrical felly and connected to the margin of one side 19 of the tire only, an outside flange 18 formed onto the edge of the bottom, and a dovetail enlargement at the margin of the side 13 adapted to bear against the flange 18.

In testimony whereof I have hereunto set my hand in presence of two witnesses.

EDWARD HENRY SEDDON.

Witnesses:
CARL BOLLÉ,
RIDLEY JAMES URQUHART.